C. T. SCHROYER.
ANTIRATTLER FOR AUTOMOBILE DOORS.
APPLICATION FILED SEPT. 2, 1914.
1,151,723.
Patented Aug. 31, 1915.
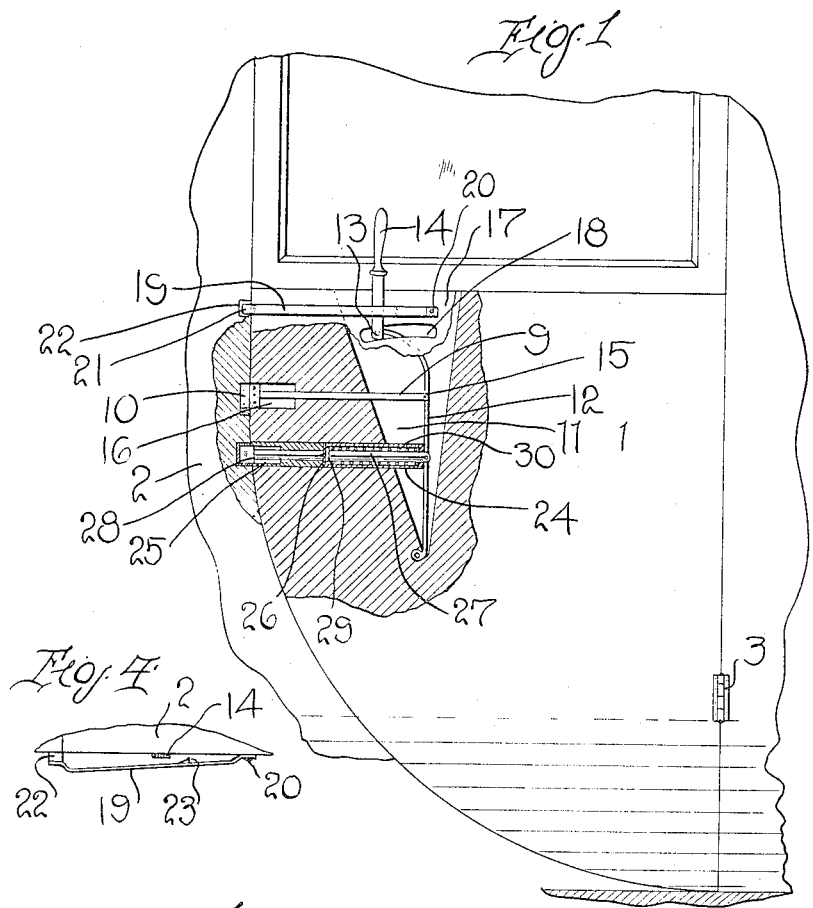
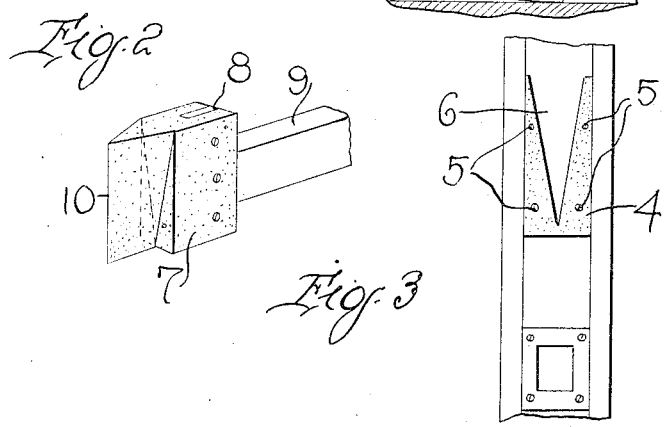
Inventor
CHARLES T. SCHROYER
Witnesses

UNITED STATES PATENT OFFICE.

CHARLES T. SCHROYER, OF SIOUX FALLS, SOUTH DAKOTA.

ANTIRATTLER FOR AUTOMOBILE-DOORS.

1,151,723.  Specification of Letters Patent.  Patented Aug. 31, 1915.

Application filed September 2, 1914. Serial No. 859,842.

*To all whom it may concern:*

Be it known that I, CHARLES T. SCHROYER, a citizen of the United States, residing at Sioux Falls, in the county of Minnehaha and State of South Dakota, have invented certain new and useful Improvements in Antirattlers for Automobile-Doors, of which the following is a specification, reference being had to the accompanying drawings.

My invention relates to certain new and useful improvements in antirattlers for automobile doors of the type shown and described in an application for Letters Patent filed by me July 20, 1914, Serial No. 852,011.

My present invention has for its object to provide means for locking the anti-rattler in retracted position when the door is in open position and for automatically releasing and throwing the same into operative position.

With these ends in view my invention consists in the details of construction and arrangement hereinafter more fully set forth.

In order that those skilled in the art to which my invention appertains may know how to make and operate my improved devices and fully appreciate the advantages thereof I will proceed to describe the same referring by numerals to the accompanying drawing in which—

Figure 1 is a fragmentary side elevation partly in section, showing an automobile door equipped with my improvement, Fig. 2 is a detail perspective of the reciprocative member of the anti-rattler, Fig. 3 is a fragmentary view of the edge of the automobile body and the other anti-rattler member, and Fig. 4 is a detail plan view showing the releasing spring bar and the ordinary door bumper for taking up the shock in closing the door.

Similar reference numerals indicate like parts in the several figures of the drawing.

1 represents an ordinary door and 2 the frame, or body of the automobile.

The door is hung upon hinges 3 in the usual manner.

4 is a rectangular block of rubber or equivalent resilient material secured in a suitable recess in the frame or body 2, by screws 5. This block is formed with a V-shaped recess 6.

7 is a second member of the anti-rattler formed with a recess 8 in its rear edge to receive the flattened front extremity of a reciprocatable member having a shank 9 and formed at its front edge with a projection or lip 10 which is V-shaped vertically and also in cross-section and the shank 9 is adapted to be attached to an operating lever, all as substantially shown and described in the pending application hereinbefore referred to.

In connection with the details of construction shown and described the following additional features of construction constituting my improvements are employed.

11 is a vertical V-shaped recess in the door 1, and at the bottom of this recess is pivoted a stiff bar 12 curved at its upper end and rigidly connected at 13 to the lower extremity of a hand lever 14.

The rear extremity of the shank 9 is pivotally connected at 15 to the bar 12 so that as the lever 14 is drawn back, the lip 10 will be withdrawn and into a recess 16 in the edge of the door 1.

In the recess 11 at the upper end is secured in any suitable manner a plate 17 having a curved slot 18 for guiding juncture 13 between the bar 12 and lever 14, in an obvious manner.

19 is a flat metal spring secured at its rear end 20 to the door and with its free end 21 extending slightly beyond the edge of the door and adapted to contact with an ordinary shock absorbing bumper 22. This spring lies over the face of the lever 14 as shown in Fig. 4, and is formed with a shoulder 23 adapted to interlock with the lever when said lever is in its rearward position and thus hold it until it is released.

24 is a cylindrical case confined within a mortise in the edge of the door and formed with a recess 25 at the outer extremity and with a partition 26 having a central orifice for the passage of the shank 27 of a reciprocatable member or latch 28 provided with a collar 29. Between the collar 29 and the rear end of this casing and surrounding the shank 27 is a spiral spring 30 which is put under compression when the latch is retracted. The rear end of the shank 27 of the latch is attached in any suitable manner to the stiff bar 12, so that as the lever 14 is drawn back it will not only retract the anti-rattler lip 10 but will likewise retract the spring latch 28, and as the lever travels over the inclined face of the shoulder 23 on the spring 19, the latter will be forced outwardly until the lever passes behind the shoulder 23 which will lock the lever against return movement and hence the lip 10 and the spring latch 28 will both be concealed within the edge of the door. When the door is closed the free end of the flat spring 19 will contact with the bumper 22 which will in an obvious manner disengage the shoulder 23 from the lever whereupon the spiral spring 30 will force the latch 28 outwardly and its shank will vibrate the bar 12 on its pivot at the bottom of recess 11 and by reason of the connection between the bar 12 and the shank 9 of the member 10, the latter will be forced within the V-shape recess or keeper 6.

From the construction shown and described it will be readily seen therefore that in pulling the lever 14 rearward the anti-rattler members will be separated and the lip 10, and also the spring latch 28 will be concealed within the edge of the door and retained in such position by reason of the lever being locked by the shoulder 23 on the flat spring 19 and will so remain until the door is closed when the contact of the free end of this spring with the bumper 22 will automatically release the lever and the anti-rattler lip and spring latch will be forced outwardly and into the desired position.

The casing 24 with the latch and spiral spring in position therein may be disposed within a cylindrical mortise extending inward from the edge of the door, and fastened in the recess in any suitable manner, with the rear extremity of the latch shank 27 secured to the bar 12.

Variations may be made in the mere details of construction without departing from the spirit of my invention.

What I claim as new and desire to secure by Letters Patent is:—

1. The combination with a door frame and a door, of a reciprocatable member mounted on the door and engaging, when projected, with the frame, a handle pivotally mounted upon the door and operatively connected to said member, a spring urging the reciprocatable member to a projected position, and acting to shift the handle with the reciprocatable member, and a locking member yieldingly mounted upon one face of the door for movement at right angles to the plane of the door and extending over the handle and having a detent engaging with the handle when the handle is retracted to prevent the movement of the handle under the action of the spring, the other end of said locking member being projected beyond the door and being adapted to engage the door casing when the door is closed, whereby to cause the movement of the locking member away from the door and the release of the handle and the reciprocatable member.

2. The combination with a door frame and a door, of a reciprocatable member mounted on the door and engaging, when projected, with the frame, a spring urging the projection of said member, a handle operatively connected with the member, and extending upward exterior to the face of the door, and a spring locking member supported at its rear end upon the face of the door and extending over the handle and projecting beyond the edge of the door, the extremity of the locking member being adapted to engage the frame of the door and to be thereby held from inward movement as the door is closed, said locking member having a detent engageable with the handle when the door is opened and released therefrom by the relative outward movement of said locking member when the door is closed, to permit the projection of the reciprocatable member under the action of the spring and when the door is closed to permit the projection of the locking member under the action of the spring.

3. The combination with a door and a door frame, the door having a vertically extending recess; of a bar pivoted at its lower end in said recess and extending upward, and formed at its upper end with a handle, a latching bolt operatively connected to the bar and extending outward through the door and adapted to engage a recess in the door frame, a spring urging the projection of said latch bolt, a plunger also pivotally connected to said bar and having a head adapted to be projected against the door frame to thereby prevent rattling, a spring locking member extending parallel to the upper edge of the door and attached at its rear end to the door and extending over the handle, the end of said locking member projecting beyond the edge of the door and adapted to engage with the frame of the door before the door is fully closed, whereby to shift the locking member outward upon the full closing of the door, and a detent carried upon said locking member and engageable with the handle when the door is opened, but shifted out of engagement with the handle upon the full closing of the door, to thereby permit the projection of the latch and plunger.

4. The combination with a door and a door frame, of an anti-rattling member fixed in the edge of the door frame, a reciprocatable anti-rattling member mounted upon said door and having a shank extending therefrom, a bar pivoted at its lower end to the door and operatively connected to said shank and having a handle at its upper end, a spring latch disposed on the door and operatively connected to said bar, and means for automatically locking the tilting handle in its rearward position when the door is opened and releasing said tilting handle when the door is closed, to thereby permit the projection of the anti-rattling member and the latch.

5. The combination with a door and a door frame, of an anti-rattling member mounted in said frame, a coöperating complemental anti-rattling member mounted on the door for reciprocation, an actuating lever operatively connected to said last named anti-rattling member, and a spring actuated latch also operatively connected with the lever, whereby a movement of the lever will cause a simultaneous retraction of the anti-rattling member and the latch and whereby a projection of the latch under the action of the spring will cause a like projection of the anti-rattling member.

6. The combination with a door frame and a door, of a reciprocating member mounted on the door, and engaging, when projected, with the frame, a handle operatively connected to said member, a spring urging the projection of the member, and a locking member comprising a flat spring attached to one end of the door, extending over the handle, and formed with a locking shoulder engaging with the handle when in its rearmost position, the free end of the spring projecting beyond the edge of the door, and a shock absorbing bumper mounted upon the door frame and adapted to contact with the other end of the spring as the door is closed to thereby shift the free end of the locking member outward to cushion the closing door and simultaneously release the tilting handle to permit the projection of the reciprocating member.

In testimony whereof I hereunto affix my signature in the presence of two witnesses.

CHARLES T. SCHROYER.

Witnesses:
M. CHRISTENSEN,
K. S. MYRLAND.

Copies of this patent may be obtained for five cents each, by addressing the "Commissioner of Patents, Washington, D. C."